(12) United States Patent
Takahashi et al.

(10) Patent No.: US 8,712,678 B2
(45) Date of Patent: Apr. 29, 2014

(54) METHOD OF MEASURING A DISPLACEMENT AMOUNT FOR AN AUTOMOBILE SUSPENSION ASSEMBLY

(75) Inventors: Mitsugu Takahashi, Tochigi (JP); Takafumi Murakoshi, Tochigi (JP); Masaru Maruo, Tochigi (JP); Atsushi Osada, Tochigi (JP); Hidetoshi Takahashi, Tochigi (JP); Takao Shibayama, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 600 days.

(21) Appl. No.: 12/934,576

(22) PCT Filed: Mar. 23, 2009

(86) PCT No.: PCT/JP2009/055673
§ 371 (c)(1),
(2), (4) Date: Sep. 24, 2010

(87) PCT Pub. No.: WO2009/119510
PCT Pub. Date: Oct. 1, 2009

(65) Prior Publication Data
US 2011/0022218 A1 Jan. 27, 2011

(30) Foreign Application Priority Data

Mar. 28, 2008 (JP) ................................ 2008-086174
Mar. 31, 2008 (JP) ................................ 2008-092440
Mar. 31, 2008 (JP) ................................ 2008-092441
Mar. 31, 2008 (JP) ................................ 2008-092442

(51) Int. Cl.
*G01M 17/00* (2006.01)

(52) U.S. Cl.
USPC .......................... 701/124; 701/31.4; 700/112

(58) Field of Classification Search
USPC ............ 29/603.1, 897.2; 701/124, 34.3, 31.4; 280/5.518; 700/112–114, 117, 245
See application file for complete search history.

(56) References Cited

U.S. PATENT DOCUMENTS 5,987,591 A * 11/1999 Jyumonji ....................... 700/259
2009/0158579 A1* 6/2009 Climent et al. ............ 29/525.11

FOREIGN PATENT DOCUMENTS

EP 1 148 316 A1 10/2001
EP 1148316 A1 * 10/2001

(Continued)

OTHER PUBLICATIONS

Japanese Office Action dated Sep. 27, 2011 issued in Application No. 2008-092440.

(Continued)

*Primary Examiner* — Minh Trinh
(74) *Attorney, Agent, or Firm* — Arent Fox LLP

(57) ABSTRACT

Provided is a work measuring method by which a deviation quantity of a work measuring point from a reference position can be measured in a short time. A work surface is set as a reference point when the measuring point is positioned at the reference position, and a distance from a photographing device to a reference surface is set as a reference distance. A deviation quantity of the measurement point in a direction intersecting a photographing direction on the reference surface is measured by the photographing device, and a deviation quantity of the measuring point in the photographing direction is measured by a laser distance sensor. Then, based on the deviation quantity measured by the photographing device, the deviation quantity measured by the laser distance sensor, and the reference distance, a deviation quantity of the measuring point in a direction intersecting the photographing direction is calculated.

2 Claims, 10 Drawing Sheets

(56) References Cited

FOREIGN PATENT DOCUMENTS

| | | |
|---|---|---|
| JP | 49-74967 | 7/1974 |
| JP | 61-193005 A | 8/1986 |
| JP | H01-144183 U | 10/1989 |
| JP | 2-32203 A | 2/1990 |
| JP | 06-226668 A | 8/1994 |
| JP | 06226668 A * | 8/1994 |
| JP | 7-108963 A | 4/1995 |
| JP | 09-066425 A | 3/1997 |
| JP | 11-295032 A | 10/1999 |
| JP | 2001-4377 A | 1/2001 |
| JP | 2004-069373 A | 3/2004 |
| JP | 2006-090744 A | 4/2006 |
| JP | 2007-069826 A | 3/2007 |
| JP | 2007-216789 A | 8/2007 |
| WO | WO 97/24206 A1 | 7/1997 |

OTHER PUBLICATIONS

Japanese Office Action dated Sep. 27, 2011 issued in Application No. 2008-0924411.

Japanese Office Action dated Feb. 7, 2012 issued in corresponding Japanese Application No. 2008-086174.

* cited by examiner

METHOD OF MEASURING A DISPLACEMENT AMOUNT FOR AN AUTOMOBILE SUSPENSION ASSEMBLY

TECHNICAL FIELD

The present invention relates to a work measuring method, a method for attaching a suspension assembly, and an apparatus for attaching a suspension assembly.

In detail, it relates to a work measuring method using a photographing device and a laser distance sensor to measure a position of a measurement point of a work such as a suspension assembly relative to the photographing device. In addition, it relates to a method for attaching and an apparatus for attaching a suspension assembly that fixes the suspension assembly to the body of an automobile by bolts.

BACKGROUND ART

Conventionally, in the manufacturing process of automobiles, a suspension assembly has been attached to the body.

The suspension assembly is assembled by connecting the lower end side of a pair of left and right dampers of a front side or rear side with a sub-frame. In addition, a pair of damper housings in which the pair of dampers is accommodated is formed in the body. An upper end side of the pair of dampers is accommodated in each of the pair of damper housings and is supported by attaching such a suspension assembly to the body.

Herein, variability occurs in the position of the body; therefore, it is necessary to measure the displacement amount of the position of the body. Therefore, with a hole formed in the body set as a measurement point, this suspension assembly is attached to the body by measuring the displacement amount from a reference position of this measurement point, and correcting the movement of a robot that has been taught in advance.

Incidentally, although the displacement amount in an in-plane direction of the photographed image, i.e. the displacement amount in a direction intersecting a photographing direction, can be measured with high precision with the special characteristics of a CCD camera, it is difficult to measure the displacement amount in the photographing direction with high precision thereby.

Therefore, in order to measure the distance in the photographing direction with high precision, a laser distance sensor has been provided and the displacement amount in the photographing direction at a measurement point of the body has been measured by this laser distance sensor, after which the focal length of the CCD camera has been corrected based on this displacement amount measured, and the displacement amount in a direction intersecting the photographing direction at the measurement point of the body has been measured by this CCD camera (refer to Patent Document 1).

In addition, high precision has been demanded in attachment of suspension assemblies to bodies because, if the attachment position of the suspension assembly shifts from the reference position, a difference in left and right camber angles arises.

Therefore, a method is shown in Patent Document 2, for example, for suspension assembly positioning in which the object is to improve the attachment precision of the suspension assembly. With this positioning method, the center position of the body and the center position of the suspension assembly are calculated based on a detection signal from a plurality of distance sensors, and the position of the suspension assembly is adjusted so that these center positions match.

After the position of the suspension assembly has been adjusted in the above such way, the suspension assembly is fixed to the body by tightening bolts provided at an upper end side of the pair of dampers.

In addition, the suspension assembly is fixed to the body by tightening bolts of a plurality of locations. In this case, at each tightening locations, a dedicated nut runner (refer to Patent Document 3) is arranged, respectively.

However, if a dedicated nut runner is provided to each tightening location, in a case of tightening a tightening location at a position that differs for each model, displacement will arise between the arrangement locations of the nut runners and the tightening locations of the suspension assembly. In such a case, conventionally, it has been compensated for by providing in advance a jig to correct these positional displacements on a mounting stand for the suspension assembly, and tightening via this jig.

Patent Document 1: Republication of Internal Publication No. WO 97/24206
Patent Document 2: Japanese Unexamined Patent Application Publication No. 2007-69826
Patent Document 3: Japanese Unexamined Patent Application Publication No. 2007-216789
Patent Document 3: Japanese Unexamined Patent Application Publication No. H9-66425

DISCLOSURE OF THE INVENTION

Problems to be Solved by the Invention

However, after measured by the laser distance sensor, time has been required in measurement of the displacement amount of the measurement point of the work since the focal distance of the CCD camera is corrected.

In addition, the suspension assembly is formed by joining a plurality of components such as dampers and a sub-frame, and has a complicated three-dimensional shape. As a result, when tightening the bolts on the upper end side of the dampers in the way described above, the sub-frame may move and the left and right camber angles may shift as a result.

In addition, since the alignment may be negatively influenced if the position relative to the body of the suspension assembly shifts from left and right symmetrical positions, it is necessary to attach with high precision so as to be left and right symmetrical. However, when fixing a plurality of locations with bolts, if the sequence in which the bolts are tightened is not taken into account, the sub-frame of the suspension assembly may rotate, and the attitude relative to the body may shift from a left and right symmetrical position.

In addition, if using the aforementioned such dedicated jig, in a case of there being a plurality of tightening locations at different positions, it is necessary to produce a dedicated jig for each of these tightening locations. In addition, since a dedicated jig must be produced when developing a new model, the cost required for equipment may increase.

The present invention has an object of providing a work measuring method by which a displacement amount of a measurement position of a work from a reference position can be measured in a short time.

In addition, the present invention has an object of providing a method of attaching a suspension assembly by which a suspension assembly can be attached to a body while reducing the difference in the left and right camber angles as much as possible.

Moreover, the present invention has an object of providing a method for attaching a suspension assembly by which the suspension assembly can be attached to the body of an automobile with high precision.

Furthermore, the present invention has an object of providing an apparatus for attaching a suspension assembly that can reduce the cost required for equipment.

Means for Solving the Problems

According to a work measuring method of the present invention, in the work measuring method of measuring a displacement amount of a measurement point (e.g., the measurement point P described later) of a work (e.g., the body 10 described later) surface from a reference position (e.g., the reference position P1 described later) using a photographing device (e.g., the COD camera 20 described later) and a laser distance sensor (e.g., the laser distance sensor 30 described later), in a case of the measurement point being positioned at the reference position, the work surface is set as a reference plane (e.g., the reference plane R described later), and a distance from the photographing device to the reference plane is set as a reference distance (e.g., the reference distance Lm described later), a displacement amount (e.g., the displacement amount a described later) of the measurement point in a direction intersecting a photographing direction in the reference plane is measured by the photographing device, and a displacement amount (e.g., the displacement amount Lg described later) of the measurement point in the photographing direction is measured by the laser distance sensor, a displacement amount (e.g., the displacement amount b described later) of the measurement point in a direction intersecting the photographing direction is calculated based on the displacement amount measured by the photographing device, the displacement amount measured by the laser distance sensor, and the reference distance.

According to the present invention, the displacement amount of the measurement point in a direction intersecting the photographing direction in the reference plane is measured by the photographing device, and the displacement amount of the measurement point in the photographing direction is measured by the laser distance sensor. Therefore, the displacement amount of the measurement point in a direction intersecting the photographing direction is calculated based on the displacement amount measured by the photographing device, the displacement amount measured by the laser distance sensor, and the reference distance.

Therefore, since it is not necessary to measure with the photographing device after having measured with the laser distance sensor as is conventionally, the displacement amount of the measurement point of the work from the reference position can be measured in a short time.

According to a method for attaching a suspension assembly of the present invention, the method for attaching a suspension assembly of attaching a suspension assembly (e.g., the suspension assembly 20 described later), which has a pair of dampers (e.g., the damper assemblies 24L and 24R described later) and a frame (e.g., the sub-frame 21 described later) that connects a lower end side of the pair of dampers, to a body of an automobile (e.g., the body 10 described later) includes: a step of measuring a pair of reference positions (e.g., the positions BL and BR of the damper mounting holes 13L and 13R described later) provided on the body that are references for an attitude of the body, and calculating a center position (e.g., the position BC described later) of the body; a step of measuring a pair of reference positions (e.g., the positions SL and SR of the sub-frame reference holes 26L and 26R described later) provided on the suspension assembly that are references for an attitude of the suspension assembly, and calculating a center position (e.g., the position SC described later) of the suspension assembly; and a step of attaching the suspension assembly to the body so that the center position of the body and the center position of the suspension assembly match, in which, in the step of attaching the suspension assembly to the body, the frame of the suspension assembly is fixed to the body, and an upper end side of the pair of dampers (e.g., the damper mounts 243L and 243R described later) is fixed to a damper housing (the damper housings 12L and 12R described later) in the body in which the pair of dampers is accommodated.

According to the present invention, the center position of the body and the center position of the suspension assembly are calculated, and the suspension assembly is attached to the body so that this center position of the body and center position of the suspension assembly match. Furthermore, herein, the frame connecting the lower end sides of the pair of dampers are fixed to the body, while the upper end side of the pair of dampers are fixed to the damper housings of the body.

In this way, by fixing the upper end side and lower end side of the pair of dampers in the same process, the sub-frame does not move as conventionally. With this, the suspension assembly can be attached to the body with the difference in the left and right camber angles reduced as much as possible.

According to a method for attaching a suspension assembly of the present invention, the method for attaching a suspension assembly) of fixing the suspension assembly (e.g., the suspension assembly 20 described later to a body (e.g., the body 10 described later) of an automobile at a plurality of locations by bolts includes: a step of tightening in pairs tightening locations positioned symmetrically relative to a central axis of the body, among the tightening locations of the suspension assembly; and a step of tightening tightening locations positioned unsymmetrically relative to the central axis of the body, among the tightening locations of the suspension assembly.

According to the present invention, among the plurality of tightening locations in the suspension assembly, the tightening locations positioned symmetrically relative to the central axis of the body are tightened in pairs. Thereafter, the tightening locations positioned unsymmetrically relative to the central axis are tightened. In this way, it is possible to prevent the suspension assembly from rotating relative to the body, and the attitude relating to the body from shifting from a left-right symmetrical position, by tightening the tightening locations positioned symmetrically relative to the central axis of the body in pairs. Therefore, the suspension assembly can be attached to the body with high precision.

According to a method for attaching a suspension assembly of the present invention, the apparatus for attaching a suspension assembly (e.g., the mounting system 1) for a plurality of models of automobile that tightens the suspension assembly (e.g., the suspension assembly 20) having a pair of dampers (e.g., the damper assemblies 24L and 24R) to a body (e.g., the body 10) by bolts, includes: a robot (e.g., the tightening robots 60L, 60R, 61L, and 61R described later) that tightens a tightening location that is common to the plurality of models; and a unique location tightening device (e.g., the unique location tightening units 70L, 70R, 71L, and 71R described later) that tightens a unique tightening location to each of the plurality of models, in which the robot includes a robot arm (e.g., the arm 63 described later), and a nut runner (e.g., the nut runner 65 described later) that is attached to a tip end of the robot arm, the unique location tightening device includes a nut runner (e.g., the nut runner 71 described later), an advance/retract mechanism (e.g., the advance/retract mechanism 72 described later) that causes the nut runner to advance and retract relative to the suspension assembly, and a transfer mechanism (e.g., the transfer mechanism 73 described later) that supports the advance/retract mechanism to be movable along a plane that intersects with an advance/retract direction, and the robot causes the advance/retract mechanism to move along a plane that intersects with the advance/retract direction by operating the advance/retract mechanism, and causes the nut runner of the unique location tightening device to oppose the unique tightening location.

According to the present invention, since the tightening robot that tightens a tightening location common to a plurality of models and a unique location tightening device that tightens a tightening location unique to each of a plurality of models are provided, the versatility and operation rate of the apparatus for attaching a suspension assembly can be improved. In addition, since it is not necessary to produce a dedicated jig when developing a new model, the cost required for equipment can be reduced.

In addition, when making the nut runner of this unique location tightening device to oppose a unique tightening location, the advance/retract mechanism is manipulated by the robot that tightens a common tightening location, and this advance/retract mechanism is made to move along a plane intersecting the advance/retract direction of this advance/retract mechanism. In other words, since it is not necessary to provide a driving source for causing the advance/retract mechanism to move along the plane intersecting the advance/retract direction in this unique location tightening device, the cost required for equipment can be reduced.

Effects of the Invention

According to the work measuring method of the present invention, the displacement amount of the measurement point in a direction intersecting the photographing direction in the reference plane is measured by the photographing device, and the displacement amount of the measurement point in the photographing direction is measured by the laser distance sensor. Therefore, the displacement amount of the measurement point in a direction intersecting the photographing direction is calculated based on the displacement amount measured by the photographing device, the displacement amount measured by the laser distance sensor, and the reference distance. Therefore, since it is not necessary to measure with the photographing device after having measured with the laser distance sensor as is conventionally, the displacement amount of the measurement point of the work from the reference position can be measured in a short time.

According to the method for attaching a suspension assembly of the present invention, by fixing the upper end side and lower end side of the pair of dampers in the same process, the sub-frame does not move as conventionally. With this, the suspension assembly can be attached to the body with the difference in the left and right camber angles reduced as much as possible.

According to the method for attaching a suspension assembly of the present invention, it is possible to prevent the suspension assembly from rotating relative to the body, and the attitude relating to the body from shifting from a left-right symmetrical position, by tightening the tightening locations positioned symmetrically relative to the central axis of the body in pairs. Therefore, the suspension assembly can be attached to the body with high precision.

According to the apparatus for attaching a suspension assembly of the present invention, the versatility and operation rate of the apparatus for attaching a suspension assembly can be improved. In addition, since it is not necessary to produce a dedicated jig when developing a new model, the cost required for equipment can be reduced. In addition, since it is not necessary to provide a driving source for causing the advance/retract mechanism to move along a plane intersecting the advance/retract direction in this unique location tightening device, the cost required for equipment can be reduced.

EXPLANATION OF REFERENCE NUMERALS

Figure 1:
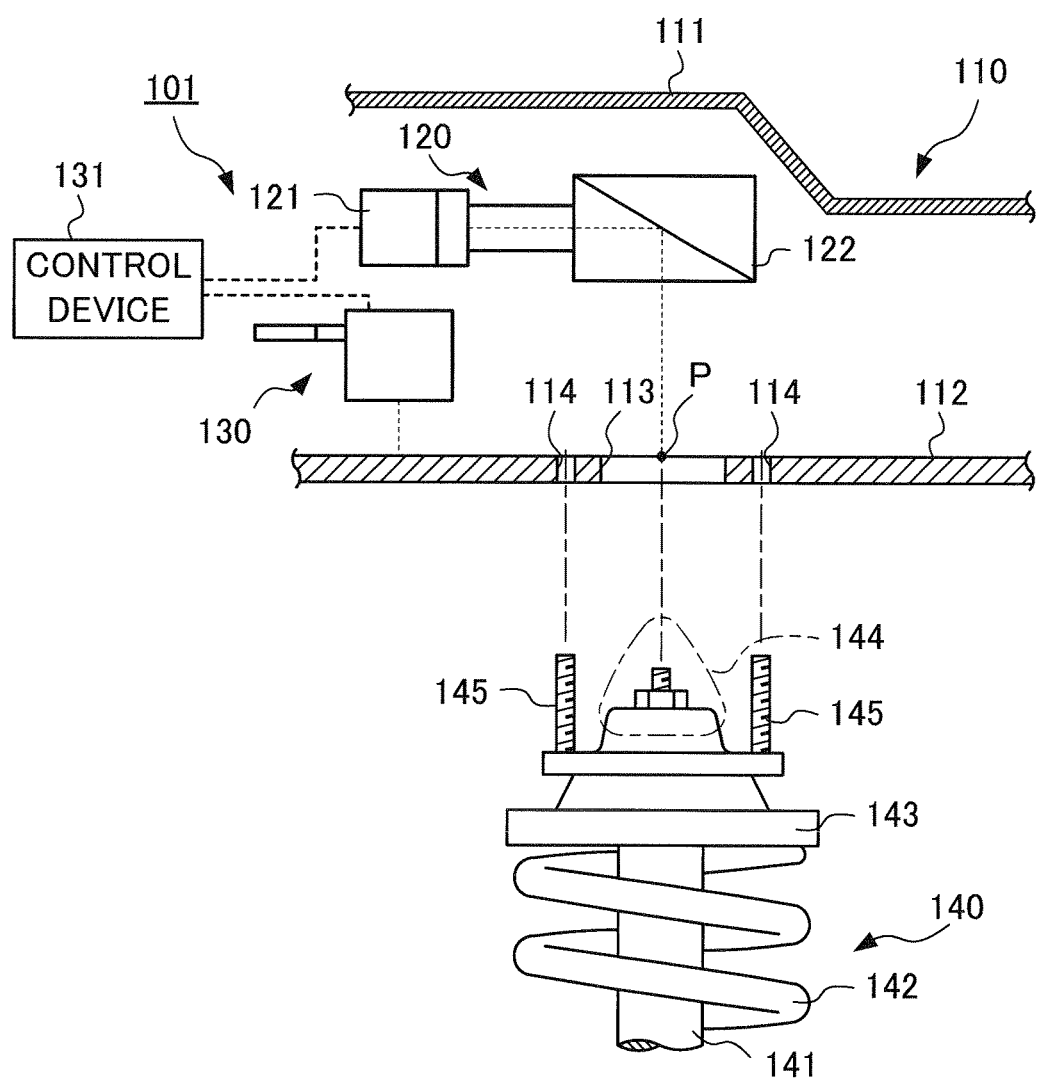
FIG. 1 is a side view showing a configuration of a work measuring system to which the work measuring method according to a first embodiment of the present invention is applied.

1 mounting system
2 body conveying apparatus
10 body (work)
12L, 12R damper housing
13L, 13R damper mounting hole
14L, 14R lower frame
20 suspension assembly
21 sub-frame (frame)
24L, 24R damper assembly (pair of dampers)
26L, 26R sub-frame reference hole
3 assembly support device
40 position sensor system
50 tightening system
60L, 60R, 61L, 61R tightening robot (robot)
61 robot main body
63 arm (robot arm)
65 nut runner
67 clamp unit
671, 672 chuck portion
70L, 70R, 71L, 71R unique location tightening unit (unique location tightening device)
71 nut runner
72 advance/retract mechanism
724 gripping portion 723 pneumatic cylinder
73 transfer mechanism
74 cross-linear guide
75 lock mechanism
71FL, 72FL, 73FL, front left tightening location
71FR, 72FR, 73FR front right tightening location
71RL, 72RL, 73RL rear left tightening location
71RR, 72RR, 73RR rear right tightening location
90 control device
91 alignment control portion
92 tightening control portion
110 body
120 CCD camera (photographing device)
130 laser distance sensor
Lg displacement amount of measurement point in photographing direction
Lm reference distance
P measurement point
P1 reference position
R reference plane
a displacement amount of measurement point in direction intersecting photographing direction in reference plane
b displacement amount of measurement point in direction intersecting photographing direction

PREFERRED MODE FOR CARRYING OUT THE INVENTION

Each embodiment of the present invention will be explained hereinafter based on the drawings.

FIG. 1 is a side view showing a configuration of a work measuring system 101 to which a work measuring method according to a first embodiment of the present invention has been applied.

The work measuring system 101 is a system that measures a position of a body 110 when attaching the body 110 of a vehicle as a work to a suspension assembly 140.

Damper housings 112, and dash board uppers 111 positioned above these damper housings are formed in the body 110.

A mount insertion hole 113 of circular shape, and a plurality of bolt insertion holes 114 formed around this mount insertion hole 113 are formed in the damper housing 112.

The suspension assembly 140 is assembled by connecting the front left and right dampers and the suspension with the sub-frame.

This suspension assembly 140 includes a damper 141 of substantially rod shape, 1 spring 142 provided substantially concentrically in the damper 141, and a damper mount 143 of substantially disk shape provided on a tip end side of the damper 141.

A damper cap 144 is removably provided at the middle of the damper mount 143, and a plurality of bolts 145 are installed upright at the periphery of the damper mount 143

The work measuring system 101 is inserted between the dash board upper 111 of the body 110 and the left and right damper housings 112, and measures the center of the mount insertion hole 113 of circular shape formed in the damper housing 112 as a measurement point P.

Then, the body 110 is attached to the suspension assembly 140 so that an end of the damper cap 144 of the damper mount 143 passes through this measurement point P.

The work measuring system 101 includes a CCD camera 120 as a photographing device, a laser distance sensor 130, and a control device 131 that controls these.

The CCD camera 120 includes a camera main body 121 that captures an image, and a mirror unit 122 that causes incident light to be reflected and emitted towards the camera main body 121.

The control device 131 obtains the measurement point P based on the image captured by the CCD camera 120 and the distance measured by the laser distance sensor 130.

Figure 2:
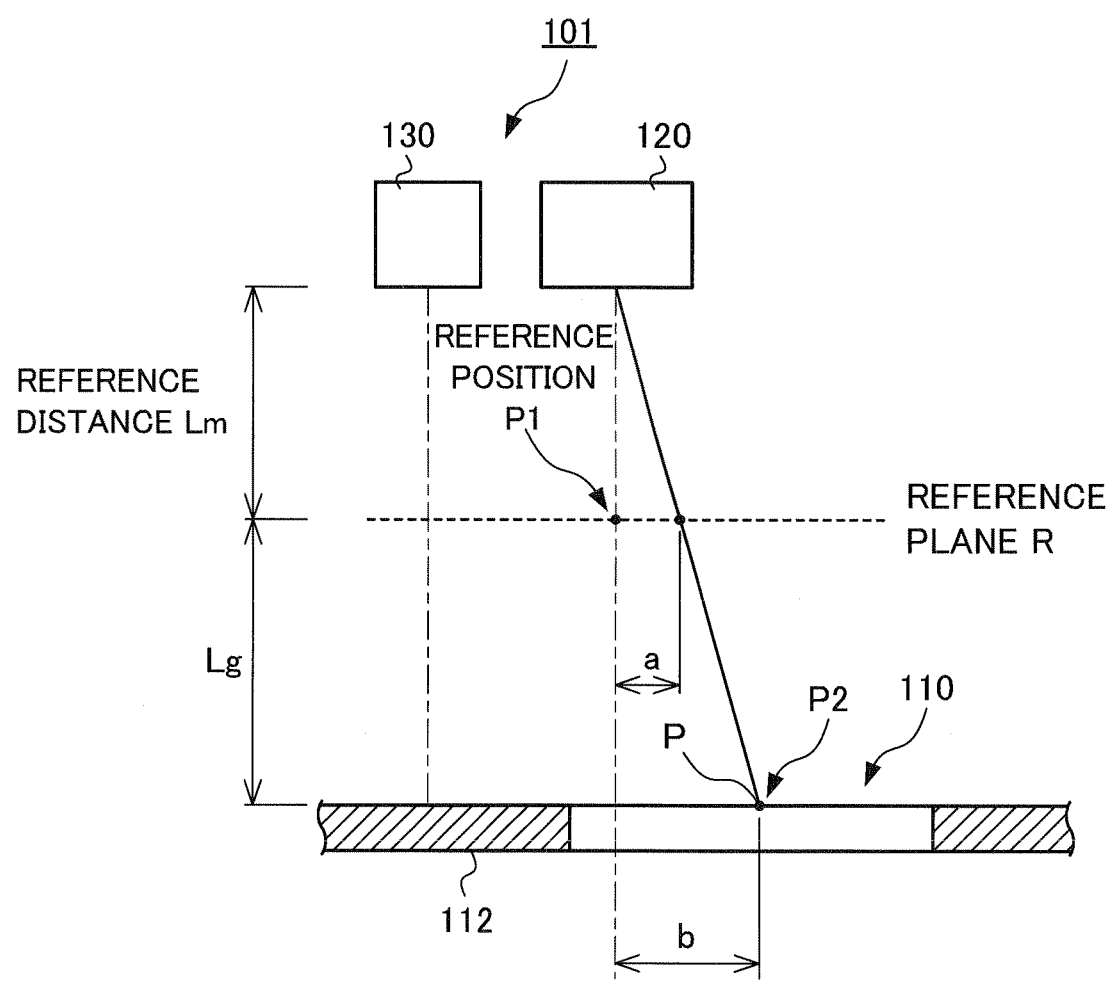
FIG. 2 is a graph for illustrating a sequence of measuring the displacement amount of measurement points from reference positions by way of the work measuring system according to the embodiment.

A sequence of measuring displacement of the measurement point P on the damper housing 112 by way of the above work measuring system 101 will be explained while referring to FIG. 2.

First, a reference position of the measurement point P is set as P1, and a surface of the damper housing 12 when the measurement point P is positioned at the reference position P1 is set as a reference plane R. This reference plane R is separated from the CCD camera 120 in the photographing direction only by a reference distance Lm, and the focal point of the CCD camera 120 is tailored to the reference plane R. Therefore, the displacement amount in an in-plane direction of the measurement point P of the reference plane R in the captured image, i.e. the displacement amount in a direction intersecting the photographing direction, becomes measurable with high precision by this CCD camera 120.

The body 110 that is the work is conveyed, and the measurement point P of this body 110 is positioned at a position P2 shifted from the reference position P1.

First, the COD camera 120 and the laser distance sensor 130 are transferred to a position opposing the reference position P1 of the measurement point P of the damper housing 112.

Next, the damper housing 112 is photographed by the CCD camera 120, the profile of the mount insertion hole 113 is recognized by the control device 131 based on this image thus captured, and the center of the profile of this mount insertion hole 113 is obtained as the actual position P2 of the measurement point P. Then, the actual position P2 thus obtained and the reference position P1 stored in advance are compared, and a displacement amount a in the reference plane R of the measurement point P in a direction intersecting the photographing direction is measured. Simultaneously, the distance to the surface of the damper housing 112 is measured by the laser distance sensor 130, and is set as a displacement amount Lg of the measurement point P in the photographing direction.

Next, a displacement amount b of the measurement point P in a direction intersecting the photographing direction is calculated by the control device 131 based on the displacement amount a measured by the CCD camera 120, the displacement amount Lg measured by the laser distance sensor 130, and the reference distance Lm.

More specifically, it is calculated based on the following formula (1).

$$b = a(Lm+Lg)/Lm \quad (1)$$

According to the present invention, there are the following effects.

(1) The displacement amount a of the measurement point P in a direction intersecting the photographing direction in the reference plane R is measured by the CCD camera 120, and the displacement amount Lg of the measurement point P in the photographing direction is measured by the laser distance sensor 130. Then, the displacement amount b of the measurement point P in a direction intersecting the photographing direction is calculated based on the displacement amount a measured by the COD camera 120, the displacement amount Lg measured by the laser distance sensor 130, and the reference distance Lm.

Therefore, since it is not necessary to measure with the CCD camera 120 after having measured with the laser distance sensor 130 as is conventionally, the displacement amount of the measurement point P of the body 110 from the reference position P1 can be measured in a short time.

Figure 3:
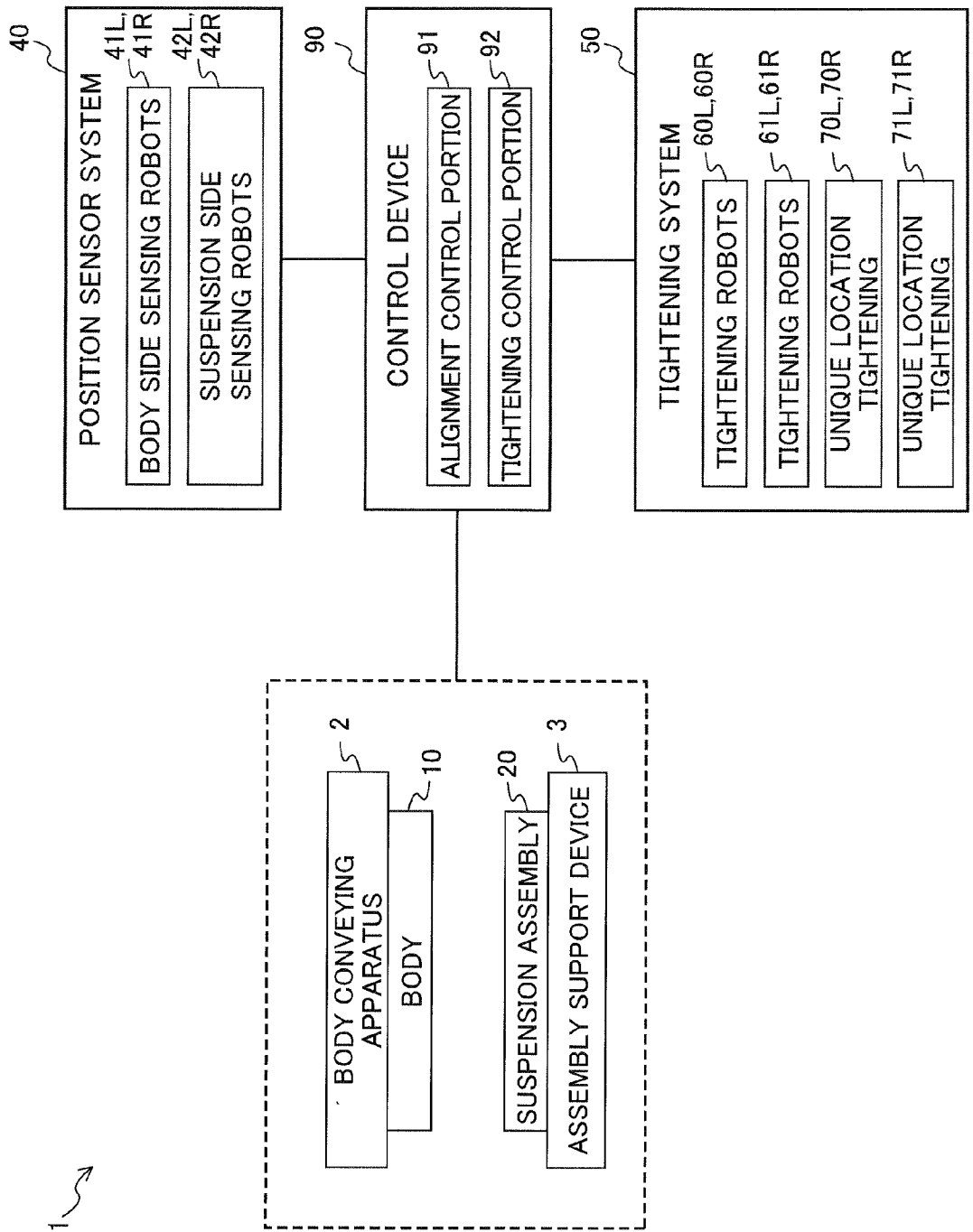
FIG. 3 is a schematic diagram showing a configuration of a mounting system according to a second embodiment of the present invention.

FIG. 3 is a block diagram showing a configuration of a mounting system 1 of a suspension assembly as an apparatus for attaching a suspension assembly according to a second embodiment of the present invention. The method for attaching a suspension assembly is performed with this mounting system 1.

The mounting system 1 attaches the suspension assembly 20 at a predetermined position of the body 10 of an automobile, and is provided at a part of the production line of the automobile.

The mounting system 1 is configured to include a body conveying apparatus 2 that conveys the bodies 10, an assembly support device 3 that supports the suspension assembly 20, a position sensor system 40 that detects a position of the body 10 and the suspension assembly 20, a tightening system 50 that fixes the body 10 and the suspension assembly 20 by bolts, and a control device 90 that controls these.

Figure 4:
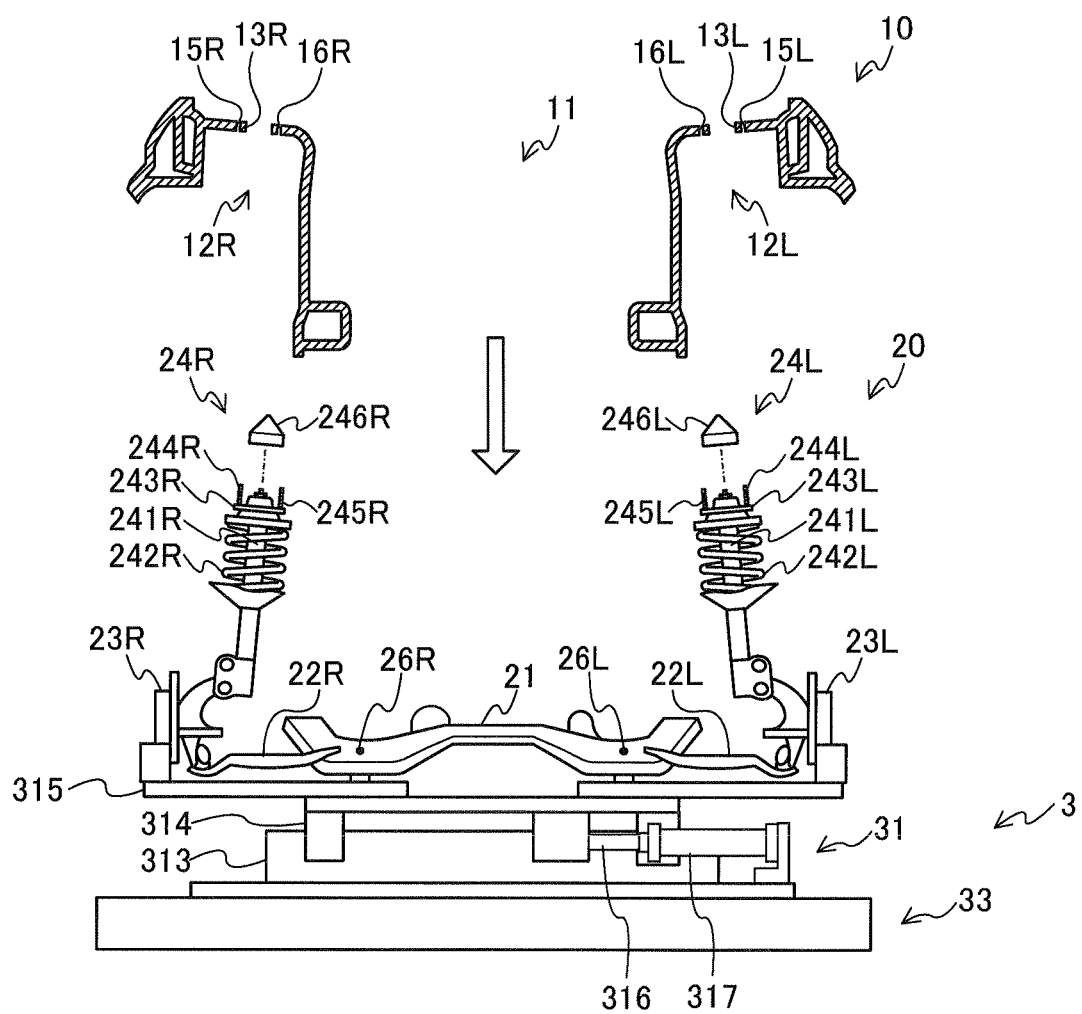
FIG. 4 is a schematic diagram showing configurations of a body and suspension assembly according to the embodiment.

FIG. 4 is a schematic diagram showing a configuration of the body 10 and the suspension assembly 20.

The suspension assembly 20 configures the undercarriage of the automobile, and is configured to include a front suspension assembly to which a pair of front wheels is attached, and a rear suspension assembly to which a pair or rear wheels is attached. FIG. 4 shows the front face of such a suspension assembly 20, i.e. only a configuration of a front side.

The suspension assembly 20 is configured by joining a plurality of components in general left-right symmetry with the sub-frame 21 as a base. A pair of lower arms 22L and 22R, hubs 23L and 23R, and damper assemblies 24L and 24R are attached to both left and right sides of the sub-frame 21, and an engine, which is not illustrated, is attached to substantially the center of the sub-frame 21. A pair of front wheels, which are not illustrated, is attached in a subsequent process to the hubs 23L and 23R.

In addition, sub-frame reference holes 26L and 26R formed in left-right symmetry relative to the center of the suspension assembly 20 are formed in the bottom of the sub-frame 21. These sub-frame reference holes 26L and 26R become references for the attitude of the suspension assembly 20.

The pair of damper assemblies 24L and 24R respectively include dampers 241L and 241R of substantially rod shape, springs 242L and 242R provided substantially concentrically to the dampers 241L and 241R, and damper mounts 243L and 243R configuring an upper end side of the damper assemblies 24L and 24R. The lower end side of the damper assemblies 24L and 24R are respectively connected to both end sides of the sub-frame 21 via each of the lower arms 22L and 22R.

A plurality of bolt portions 244L and 245L that extend substantially in parallel to the damper 241L is installed upright in the damper mount 243L. Similarly, a plurality of bolt portions 244R and 245R that extend substantially in parallel to the damper 241R is installed upright in the damper mount 243R.

In addition, damper caps 246L and 246R are detachably provided at the middle of the damper mounts 243L and 243R. These damper caps 246L and 246R are each formed in a cone shape, and become a guide portion when inserting into the damper mounting holes 13L and 13R described later.

In addition, although drawings and a detailed explanation thereof are omitted, a pair of damper assemblies is similarly provided in left-right symmetry also at the rear side of the suspension assembly 20.

The body 10 is an underpinning frame configuring an automobile, and a pair of damper housings 12L and 12R in which a pair of damper assemblies 24L and 24R is accommodated is formed at both left and right sides of the engine compartment 11 in which the engine is accommodated.

The damper mounting hole 13L and bolt insertion holes 15L and 16L in which the damper cap 246L and bolt portions 244L and 245L of the damper assembly 24L are respectively inserted are formed in the damper housing 12L. Similarly, the damper mounting hole 13R and bolt insertion holes 15R and 16R in which the damper cap 246R and bolt portions 244R and 245R of the damper assembly 24R are respectively inserted are formed in the damper housing 12R. These damper mounting holes 13L and 13R, bolt insertion holes 15L and 15R, and bolt insertion holes 16L and 16R are formed in left-right symmetry relative to the center of the body 10. In particular, the damper mounting holes 13L and 13R become references for the attitude of the body 10.

This body 10 is conveyed above the suspension assembly 20 in a state of being suspended on a hanger of the body conveying apparatus (not illustrated).

Figure 5:
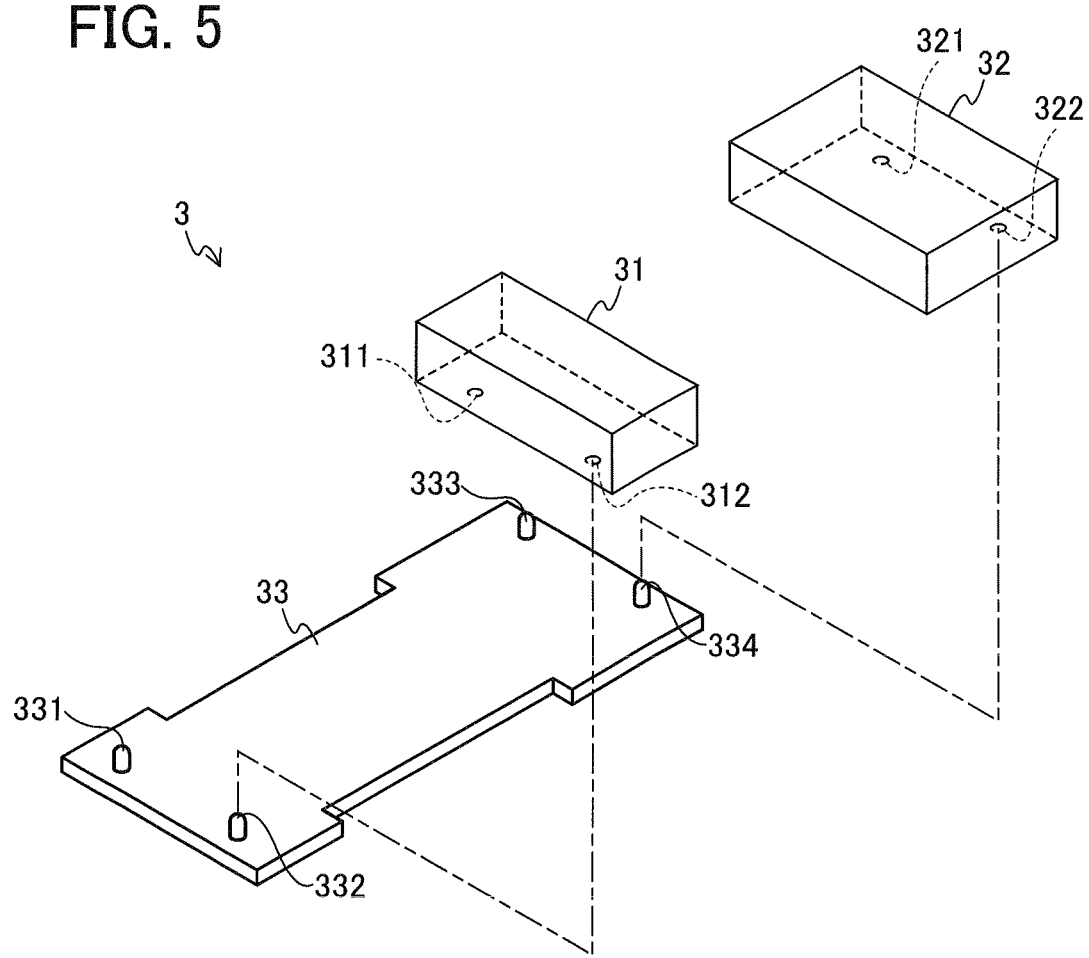
FIG. 5 is a perspective view showing a configuration of an assembly support device according to the embodiment.

FIG. 5 is a perspective view showing a configuration of the assembly support device 3.

The assembly support device 3 is configured to include a parent pallet 33 of a substantially board shape, and two child pallets 31 and 32 that are supported from underneath by this parent pallet 33.

A plurality of fixing pins 331 and 332 for fixing the child pallet 31 of a front side and a plurality of fixing pins 333 and 334 for fixing the child pallet 32 of a rear side are respectively formed at the front end side and read end side of the parent pallet 33.

The child pallets 31 and 32 respectively support the front side and rear side of the suspension assembly, and have formed therein fitting holes 311, 312 and fitting holes 321, 322 in which the aforementioned fixing pins 331, 332 and fixing pins 333, 334 fit. These child pallets 31 and 32 are each fixed to the parent pallet 33 in a state in which the front side and rear side of the suspension assembly are placed thereon.

In such an assembly support device 3, it is preferable to use a feature that is dedicated to each model in the child pallets 31 and 32, and to use a feature that is common to each model in the parent pallet 33. In this case, since only the child pallets may be exchanged when changing the model, the cost required in production of the assembly support device can be reduced.

Referring again to FIG. 4, the child pallet 31 is configured to include a slide rail 313 that extends along a width direction of the automobile, and a table 315 in which a slide guide 314 that slidingly contacts along this slide rail 313. In addition, the suspension assembly 20 is placed on the table 315. With this, it becomes possible to slidingly move the table 315 along the width direction of the automobile along with the suspension assembly 20.

In addition, the child pallet 31 further includes a cylinder 317 that causes a piston rod 316 of rod shape to advance and retract along the slide rail 313, and is made to stop at a predetermined position. A tip end portion of this piston rod 316 is connected to the table 315, which allows for control of the position of the table 315 and the suspension assembly 20 along the width direction of the automobile. This cylinder 317 is coupled to a control device, and moves based on a control signal from this control device.

Referring again to FIG. 3, the position sensor system 40 is configured to include a pair of body-side sensing robots 41L and 41R that detect positions which are references for the attitude of the body 10, and a pair of suspension-side sensing robots 42L and 42R that detect positions which are references for the attitude of the suspension assembly. This position sensor system 40 is connected to a control device 90, and detection signals of these body-side sensing robots 41L and 41R and suspension-side sensing robots 42L and 42R are supplied to the control device 90. The detailed configurations of these sensing robots 41L, 41R, 42L, and 42R will be described in detail while referring to FIG. 8 hereinafter.

The tightening system 50 is configured to include a plurality of tightening robots 60L, 60R, 61L, and 61R that fix the body 10 and the suspension assembly 20 by bolts, and unique location tightening units 70L, 70R, 71L, and 71R that are provided to pair with these tightening robots 60L, 60R, 61L, and 61R, respectively. This tightening system 50 is connected to the control device 90, and the tightening robots 60L, 60R, 61L, and 61R and unique location tightening units 70L, 70R, 71L, and 71R move based on control signals from this control device 90.

In addition, these tightening robots 60L, 60R, 61L, and 61R are each provided in the vicinity of the suspension assembly 20, and fix the tightening locations of the front left, front right, rear left, and rear right of the body 10 and the suspension assembly 20 by bolts (refer to FIG. 11 described later).

Figure 6:
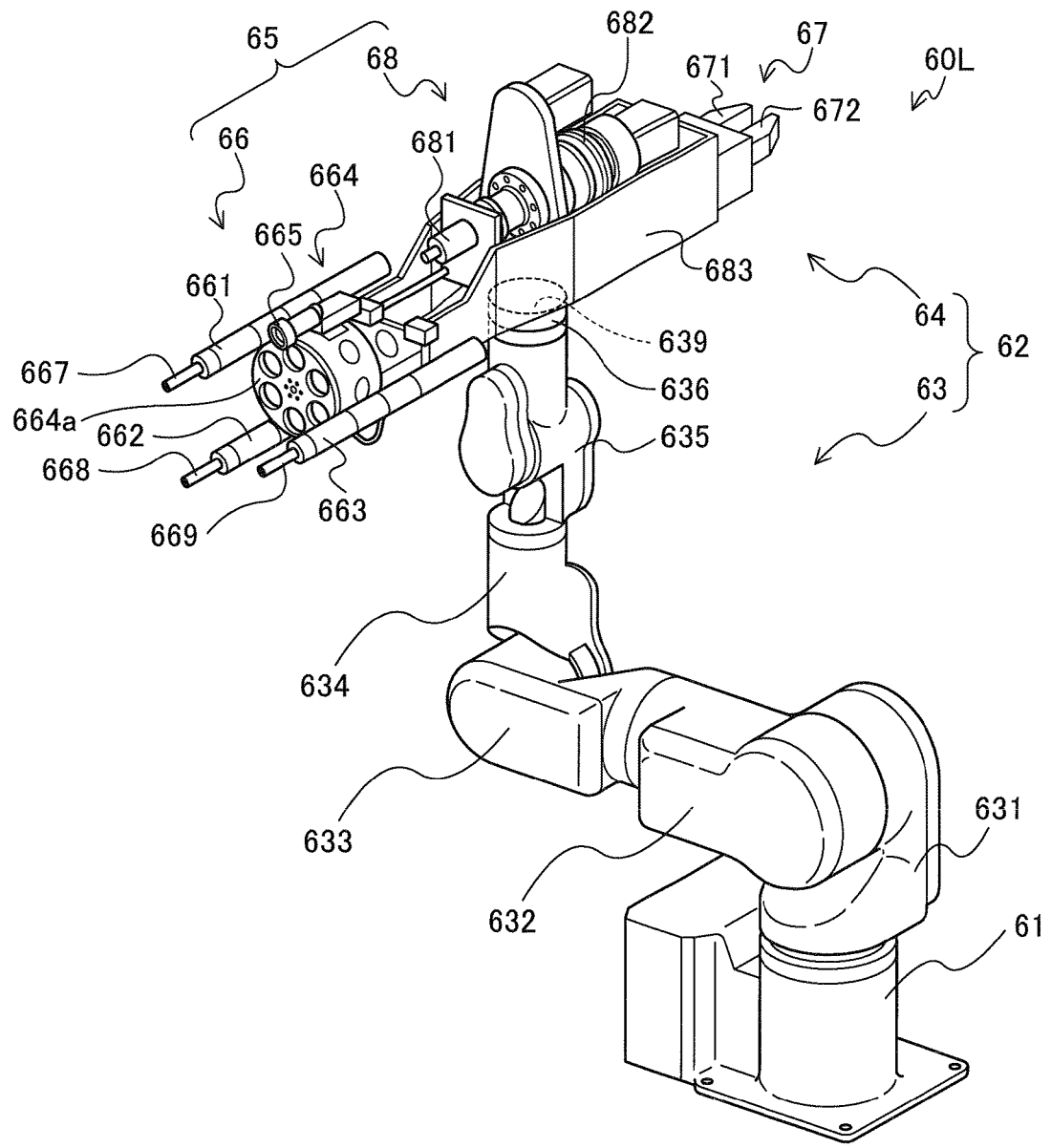
FIG. 6 is a perspective view showing a configuration of a tightening robot of a tightening system according to the embodiment.
Figure 7:
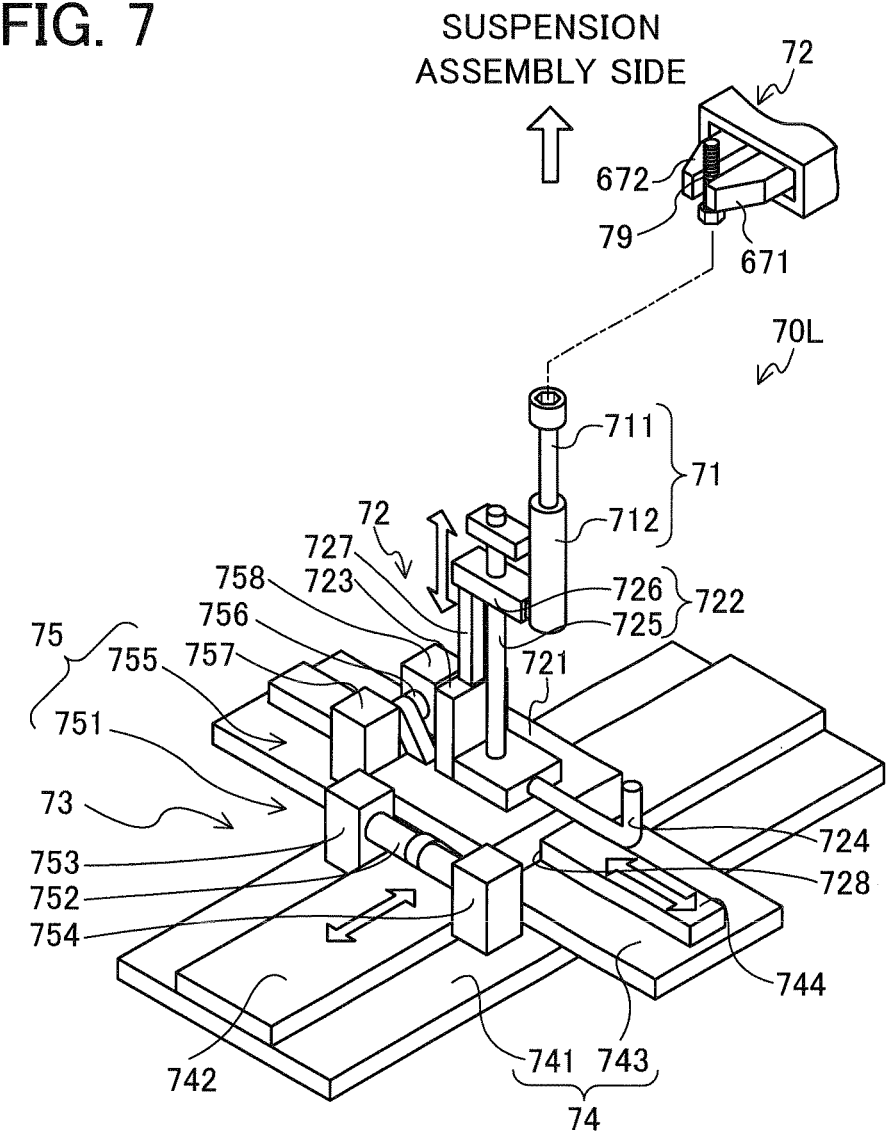
FIG. 7 is a perspective view showing a configuration of a unique location tightening unit of a tightening system according to the embodiment.

Referring to FIGS. 6 and 7, the configurations of the tightening robot 60L and the unique location tightening unit 70L will be explained in detail.

FIG. 6 is a perspective view showing the configuration of the tightening robot 60L.

FIG. 7 is a perspective view showing the configuration of the unique location tightening unit 70L. It should be noted that the configurations of the other tightening robots 60R, 61L, and 61R and the other unique location tightening units 70R, 71L, and 71R are substantially the same as that of the tightening robot 60L and the unique location tightening unit 70L, and thus drawings and explanations thereof are omitted.

As shown in FIG. 6, the tightening robot 60L includes a robot main body 61 that is attached to a floor surface, and a manipulator 62 that is provided to this robot main body 61. The manipulator 62 is 7-axis, and includes an articulated arm 63 that is pivotally supported to the robot main body 61, and a nut runner unit 64 that is pivotally supported to an end flange surface 639 of this arm 63.

The arm 63 includes a first arm portion 631, second arm portion 632, third arm portion 633, fourth arm portion 634, fifth arm portion 635, and sixth arm portion 636 in order from a side of the robot main body 61.

The first arm portion 631 extends substantially linearly, and is pivotally supported to the robot main body 61. In the robot main body 61, the first arm portion 631 is made to rotate with an axis extending in a substantially vertical direction as a center of rotation.

The second arm portion 632 extends substantially linearly, and is pivotally supported to the first arm portion 631. In the first arm portion 631, the second arm portion 632 is made to rotate by a drive mechanism, which is not illustrated, with a direction intersecting an extending direction of the first arm portion 631 as a center of rotation. With this, the angle formed between the extending direction of the first arm portion 631 and the extending direction of the second arm portion 632 changes.

The third arm portion 633 extends substantially linearly, and is pivotally supported to the second arm portion 632. In the second arm portion 632, the third arm portion 633 is made to rotate by a drive mechanism, which is not illustrated, with the extending direction of the second arm portion 632 as a center of rotation.

The fourth arm portion 634 extends substantially linearly, and is pivotally supported to the third arm portion 633. In the third arm portion 633, the fourth arm portion 634 is made to rotate by a drive mechanism, which is not illustrated, with a direction intersecting the extending direction of the third arm portion 633 as a center of rotation. With this, the angle formed between the extending direction of the third arm portion 633 and the extending direction of the fourth arm portion 634 changes.

The fifth arm portion 635 extends substantially linearly, and is pivotally supported to the fourth arm portion 634. In the fourth arm portion 634, the fifth arm portion 635 is made to rotate by a drive mechanism, which is not illustrated, with the extending direction of the fourth arm portion 634 as a center of rotation.

The sixth arm portion 636 extends substantially linearly, and is pivotally supported to the fifth arm portion 635. In the fifth arm portion 635, the sixth arm portion 636 is made to rotate by a drive mechanism, which is not illustrated, with a direction intersecting the extending direction of the fifth arm portion 635 as a center of rotation. With this, the angle formed between the extending direction of the fifth arm portion 635 and the extending direction of the sixth arm portion 636 changes.

In addition, a tip end side of the sixth arm portion 636 is the aforementioned end flange surface 639, and the nut runner unit 64 is pivotally supported thereby. In this sixth arm portion 636, the nut runner unit 64 is made to rotate by a drive mechanism, which is not illustrated, with an axis extending in an extending direction of the sixth arm portion 636 as a center of rotation.

The nut runner unit 64 includes a nut runner 65 and a clamp unit provided to a base end side of this nut runner 65.

The nut runner 65 is configured by a drive unit 68 and a tightening unit 66 as separate bodies.

The drive unit 68 is configured to include a socket drive shaft 681 that extends substantially linearly, a drive motor 682 that rotates this socket drive shaft 681 via a transfer mechanism, which is not illustrated, and a housing case 683 that accommodates this socket drive shaft 681 and drive motor 682. Three tightening tools 661, 662, and 663 described later are made to be connectable to the tip end side of this socket drive shaft 681.

The tightening unit 66 includes the three tightening tools 661, 662, and 663 of substantially rod shape, a tightening tool switching device 664 of substantially cylindrical shape that supports these tightening tools 661, 662, and 663 to be parallel with a socket drive shaft 652, and a sensor unit 665 that measures the position of an object such as a tightening location.

The tightening tools 661, 662, and 663 respectively support sockets 667, 668, and 669 of substantially rod shape to be rotatable. The sockets 667, 668, and 669 are made to be able to hold a bolt in the tip end portion thereof. In addition, the sockets 667, 668, and 669 can be rotationally driven by connecting the tightening tools 661, 662, and 663 to the socket drive shaft 681.

The tightening tool switching device 664 is configured to include a drum portion 664a of cylindrical shape and a motor that is not illustrated which rotationally drives this drum portion 664a. The tightening tools 661, 662, and 663 are provided at predetermined intervals on the peripheral surface of the drum portion 664a. In other words, the drum portion 664a rotates to arrange any of the tightening tools 661, 662, and 663 coaxially with the socket drive shaft 681, whereby it becomes possible to connect to the socket drive shaft 681.

The sensor unit 665 is configured to include a CCD camera and a distance sensor. The CCD sensor of the sensor unit 665 detects a position of a tightening location within a two-dimensional level plane. In addition, the distance sensor of the sensor unit 665 measures the distance from the light source to the target by emitting a laser beam on a target and detecting the reflected light thereof. With this, a position of a tightening location within three-dimensional space is measured.

The clamp unit 67 includes two chuck portions 671 and 672 that extend substantially linearly, and thus it is made possible to grip a bolt and manipulate a tool, jig, etc. by way of these chuck portions 671 and 672.

The above such tightening robot 60L operates as follows.

First, a bolt is supplied to the tip end portion of each of the sockets 667, 668, and 669 by a supply device, which is not illustrated.

Next, the tightening tool switching device 664 is controlled to connect any of the three tightening tools 661, 662, and 663 to the socket drive shaft 681, while the position and attitude of the nut runner unit 64 are controlled based on an input from the sensor unit 665, and the tightening unit 66 is made to face a predetermined tightening location.

Then, the drive motor 682 is controlled to rotationally drive the socket of the tightening tool that is connected, whereby the predetermined tightening location is fixed by a bolt.

In addition, in a case of successively fixing a plurality of tightening locations by bolts, the tightening tool switching device 664 is controlled to switch the tightening tool connecting to the socket drive shaft 681, while the tightening unit 66 is made to face a predetermined tightening location, and this tightening location is fixed by a bolt.

As shown in FIG. 7, the unique location tightening unit 70L is configured to include a nut runner 71 provided below the suspension assembly, an advance/retract mechanism 72 that advances and retracts this nut runner 71 relative to the suspension assembly, and a transfer mechanism 73 that supports this advance/retract mechanism 72 to be movable along with the nut runner 71 along a plane intersecting an advance/retract direction.

The nut runner 71 includes a socket 711 of substantially rod shape, and a drive unit 712 that rotates this socket 711. The socket 711 is made to be able to retain a bolt in a tip end side thereof. The drive unit 712 is equipped with a drive motor that rotates the socket 711.

The advance/retract mechanism 72 is configured to include a table 721, a nut runner support portion 722 that is provided to this table and supports the nut runner 71 to be slidable in a vertical direction, and an pneumatic cylinder 723 that moves the nut runner 71 in the vertical direction.

The table 721 is disposed on the cross-linear guide 74 of the transfer mechanism 73 described later, and is made to be able to move within a horizontal plane. In addition, a gripping portion 724 of substantially rod shape is provided in this table 721. The nut runner support portion 722 includes a support rod 725 that extends in the vertical direction, and a mounting portion 726 provided to this support rod 725 to be slidable in the vertical direction.

The nut runner 71 is mounted to one end side of this mounting portion 726 in a state in which the socket 711 is pointing upward.

The pneumatic cylinder 723 can advance and retract the shaft 727 thereof in the vertical direction. A tip end side of this shaft 727 is connected to the mounting portion 726 of the nut runner support portion 722. In other words, the nut runner 71 can be made to move in the vertical direction by driving this pneumatic cylinder 723 to cause the shaft 727 to advance or retract.

The transfer mechanism 73 is configured to include the cross-linear guide 74 that supports the table 721 to be slidable in a horizontal plane, and a lock mechanism 75 that locks movement of this cross-linear guide 74 and the table 721.

The cross-linear guide 74 is configured by combining two of a first linear guide 741 and a second linear guide 743 to be orthogonal to each other.

The first linear guide 741 includes a first slide rail 742 of substantially linear shape. On the other hand, a slide guide that is not illustrated, which slides in this first slide rail 742, is formed in the second linear guide 743. Therefore, the second linear guide 743 is supported by the first linear guide 741 to be slidable along the first slide rail 742.

The second linear guide 743 includes a second slide rail 744 of substantially linear shape. On the other hand, a slide guide 728 that is not illustrated, which slides in this second slide rail 744, is formed in the aforementioned table 721. Therefore, the table 721 is supported by the second linear guide 743 to be slidable along the second slide rail 744. In addition, this second linear guide 743 is provided to the first slide rail 742 so that the second slide rail 744 and the first slide rail 742 are orthogonal.

The lock mechanism 75 is configured to include a first lock mechanism 751 that locks the sliding motion of the second linear guide 743 along the first slide rail 742, and a second lock mechanism 755 that locks movement of the table 721 along the second slide rail 744.

The first lock mechanism 751 is configured to include a lock cylinder 752 of rod shape that is fixed to a side portion of the second linear guide 743, and a pair of holding portions 753 and 754 provided at both end sides of this lock cylinder 752.

The lock cylinder 752 includes at both end sides thereof a pair of piston rods that can advance and retract along a direction perpendicular to the first slide rail 742. With this, the holding portions 753 and 754 can be brought together to hold the first slide rail 742, and can lock sliding motion of the second guide 743 along the first slide rail 742. This lock cylinder 752 is coupled to a control device, and moves based on a control signal from this control device.

The second lock mechanism 755 is configured to include a lock cylinder 756 of rod shape that is fixed to a side portion of the table 721, and a pair of holding portions 757 and 758 provided at both end sides of this lock cylinder 756.

The lock cylinder 756 includes at both end sides thereof a pair of piston rods that can advance and retract along a direction perpendicular to the second slide rail 744. With this, the holding portions 757 and 758 can be brought together to hold the second slide rail 744, and can lock sliding motion of the table 721 along the second slide rail 744. This lock cylinder 756 is coupled to a control device, and moves based on a control signal from this control device.

The above such unique location tightening unit 70L operates as follows.

First, one among a plurality of bolts accommodated in a bolt accommodating device, which is not illustrated, is picked by the chuck portions 671 and 672 of the clamp unit 67 of the aforementioned tightening robot, and this bolt 79 is supplied to a tip end portion of the socket 711 of the nut runner 71. In addition, the locks of the first lock mechanism 751 and the second lock mechanism 755 are released.

Next, by operating the gripping portion 724 by way of the chuck portions 671 and 672 of the clamp unit 67 of the tightening robot, the table 721 is made to move within a horizontal plane, the nut runner 71 is made to oppose a predetermined tightening location of the suspension assembly, and the first lock mechanism 751 and second lock mechanism 755 are controlled to lock the nut runner 71 at a position opposing the predetermined tightening location.

Next, the pneumatic cylinder 723 is controlled to cause the nut runner 71 to approach to a side of the predetermined tightening location.

Then, the nut runner 71 is controlled to fix this tightening location by a bolt.

In a case of fixing the body and the suspension assembly by bolts at a plurality of tightening locations, it is preferable to use the tightening robot 60L and the unique location tightening unit 70L for different purposed depending on the type of tightening location.

In other words, in a case of fixing the suspension assembly to the body, although a plurality of tightening locations are fixed by bolts, this plurality of tightening locations is divided into tightening locations common to a plurality of models and unique tightening locations to each of a plurality of models.

In this case, it is preferable for the common tightening locations to be fixed by bolts by way of the tightening robot 60L based on movement taught in advance, and for the unique tightening locations to be fixed by bolts by way of the unique location tightening unit 70L.

Referring again to FIG. 3, the control device 90 includes an input circuit having functions such as shaping input signal waveforms from every type of sensor, correcting voltage levels to predetermined levels, and converting analog signal values to digital signal values, and a central processing unit (hereinafter referred to as "CPU"). In addition, the control device 90 includes a memory circuit that stores various operational programs executed by the CPU, calculation results, and the like, and an output circuit that outputs control signals to the aforementioned body conveying apparatus 2, assembly support device 3, position sensor system 40, tightening system 50, and the like. Moreover, the control device 90 includes a plurality of control blocks that functions according to the configuration of hardware such as the input circuit, CPU, memory circuit, and output circuit. More specifically, the control device 90 includes an alignment control portion 91 and a tightening control portion 92.

The alignment control portion 91 calculates center positions of the body 10 and the suspension assembly 20 based on input from the position sensor system 40, controls the body conveying apparatus 2 and the assembly support device 3 depending on displacement of these center positions, and aligns this body 10 and suspension assembly 20 at a predetermined attachment position while correcting the relative positions of the body 10 and suspension assembly 20. A sequence of this alignment will be described in detail while referring to FIGS. 8 to 10 hereinafter.

After the tightening control portion 92 has aligned the body 10 and the suspension assembly 20, it controls the tightening robots 60L, 60R, 61L, and 61R of the tightening system 50 to fix a predetermined plurality of tightening locations by bolts in a predetermined tightening order. This tightening order will be described in detail while referring to FIG. 11 hereinafter.

Figure 8:
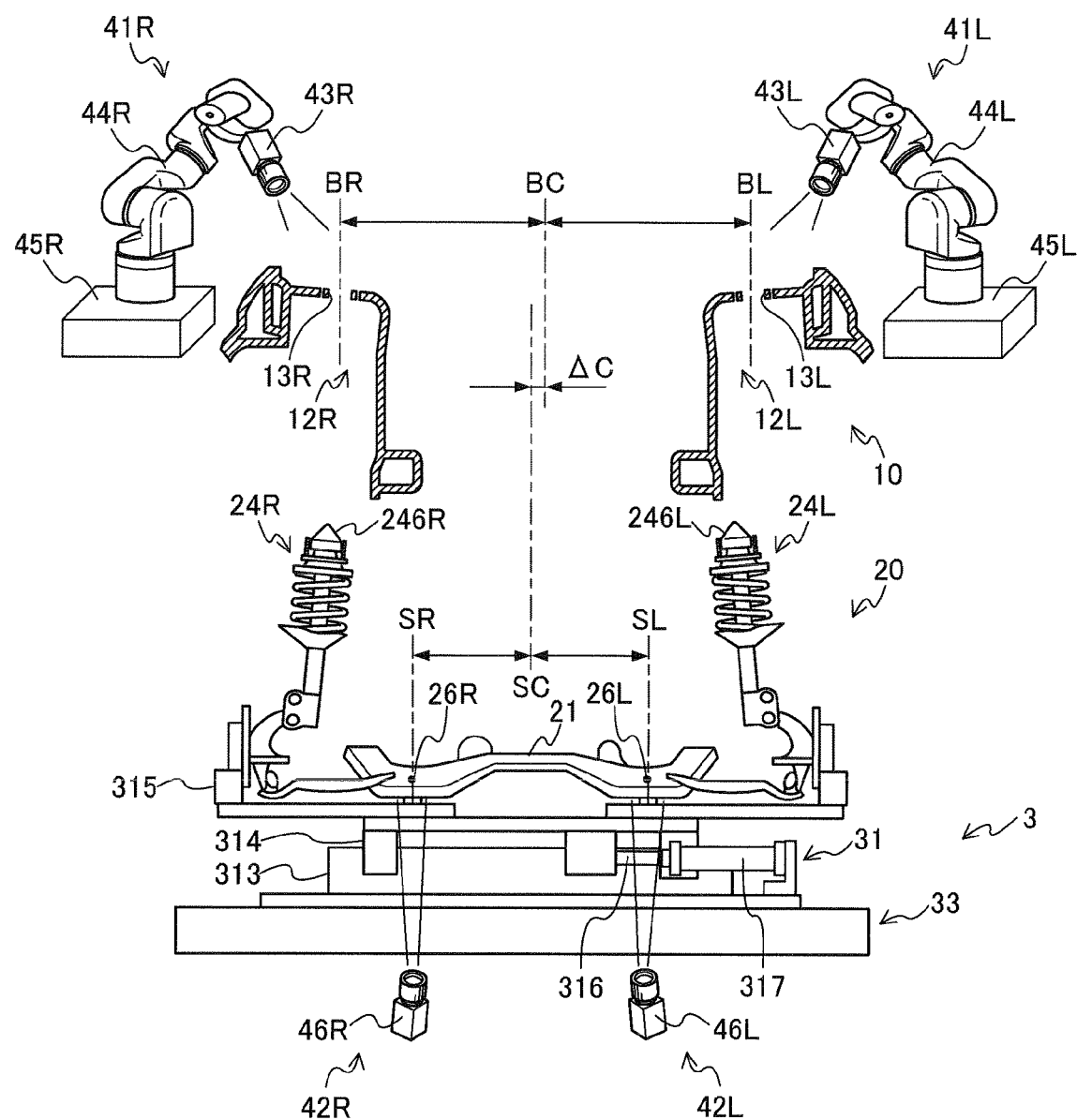
FIG. 8 is a schematic diagram showing a center calculating process according to the embodiment.
Figure 9:
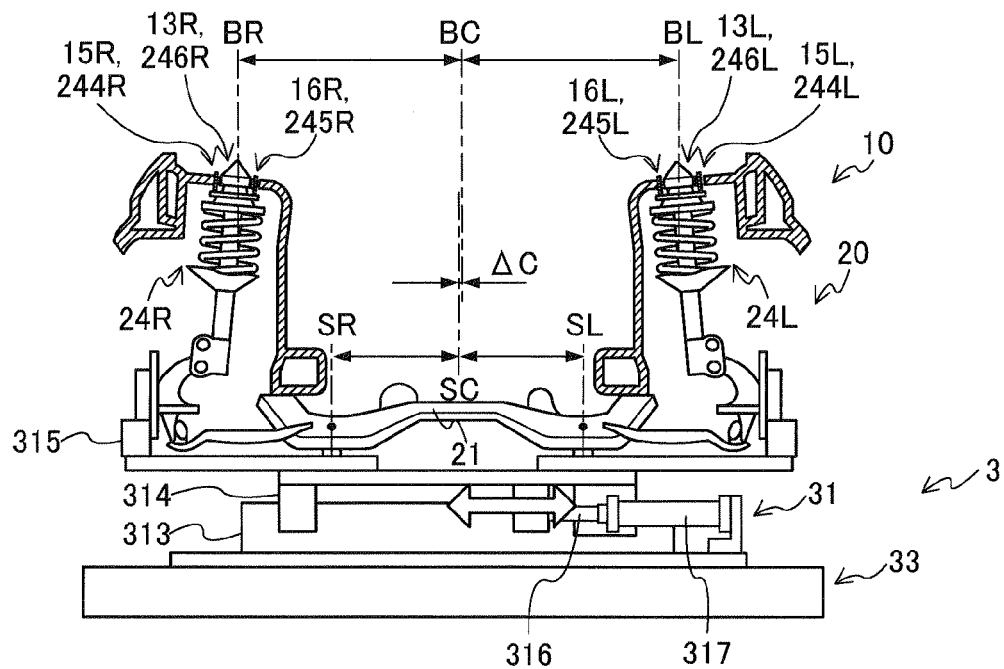
FIG. 9 is a schematic diagram showing an aligning process according to the embodiment.
Figure 10:
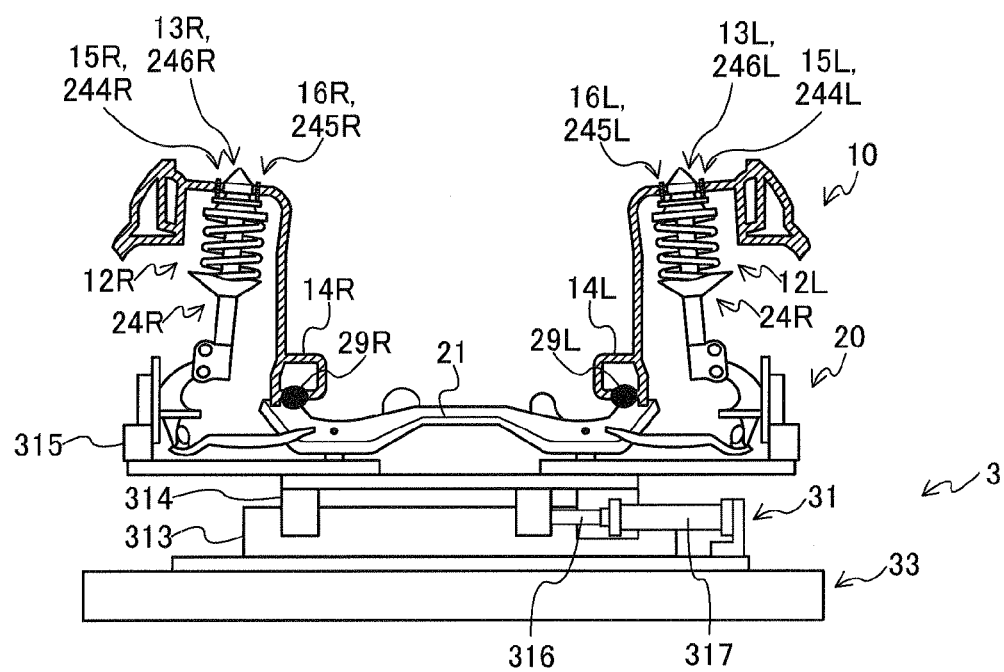
FIG. 10 is a schematic diagram showing a tightening process according to the embodiment.

Referring to FIGS. 8 to 10, a sequence of attaching the suspension assembly 20 to the body 10 will be explained.

The sequence of attaching the suspension assembly 20 to the body 10 is configured to include a center calculating process of calculating center positions of the suspension assembly 20 and the body 10, an alignment process of aligning the suspension assembly 20 and the body 10 while correcting displacement from the center, and a tightening process of fixing the suspension assembly 20 and the body 10 with bolts.

FIG. 8 is a schematic diagram showing the center calculating process, FIG. 9 is a schematic diagram showing the alignment process, and FIG. 10 is a schematic diagram showing the tightening process.

The body-side sensing robots 41L and 41R are so-called articulated robots, and respectively include sensor units 43L and 43R that measure a position of the damper mounting holes 13L and 13R, articulated arms 44L and 44R that make the attitude and position in three-dimensional space of the sensor units 43L and 43R change, and sensing robot main bodies 45L and 45R that support the articulated arms 44L and 44R.

The sensor units 43L and 43R are each configured to include a CCD camera and a distance sensor. The CCD cameras of the sensor units 43L and 43R each detect a position of the damper mounting holes 13L and 13R within a two-dimensional level plane. In addition, the distance sensors of the sensor units 43L and 43R each measure a distance from each light source to the damper mounting holes 13L and 13R by emitting laser beams on the damper mounting holes 13L and 13R and detecting the reflected light thereof. With this, the sensor units 43L and 43R measure positions of the damper mounting holes 13L and 13R in the body 10 within three-dimensional space. These sensor units 43L and 43R output information relating to the positions of the damper mounting holes 13L and 13R detected by each to the control device 90.

The suspension-side sensing robots 42L and 42R are so-called articulated robots, and respectively include the sensor units 46L and 46R that measure the positions of the sub-frame reference holes 26L and 26R, articulated arms (not illustrated) that make the attitudes and positions in three-dimensional space of the sensor units 46L and 46R change, and sensing robot main bodies (not illustrated) that support the articulated arms.

The sensor units 46L and 46R are each configured to include a CCD camera and a distance sensor. The CCD cameras of the sensor units 46L and 46R each detect a position of the sub-frame reference holes 26L and 26R within a two-dimensional level plane. In addition, the distance sensors of the sensor units 46L and 46R each measure a distance from each light source to the sub-frame reference holes 26L and 26R by emitting laser beams on the sub-frame reference holes 26L and 26R and detecting the reflected light thereof. With this, the sensor units 46L and 46R measure the positions of the sub-frame reference holes 26L and 26R in the suspension assembly 20 within three-dimensional space. These sensor units 46L and 46R output information relating to the positions of the sub-frame reference holes 26L and 26R detected by each to the control device.

As shown in FIG. 8, in the center calculating step, first, positions BL and BR of the damper mounting holes 13L and 13R in the body 10 within three-dimensional space are measured by the body-side sensing robots 41L and 41R, and a center position BC of the body 10 is calculated based on these positions BL and BR thus measured. In addition, at the same time, positions SL and SR of the sub-frame reference holes 26L and 26R in the suspension assembly 20 within three-dimensional space are measured by the suspension-side sensing robots 42L and 42R, and a center position SC of the suspension assembly 20 is calculated based on these positions SL and SR thus measured.

Next, displacement AC between the center position BC of the body 10 and the center position SC of the suspension assembly is calculated.

As shown in FIG. 9, in the alignment process, while the body conveying apparatus is being controlled to lower the body 10, the cylinder 317 is driven to move the table 315 of the child pallet 31 along a width direction along with the suspension assembly 20 so as to minimize the displacement AC between the body 10 and the suspension assembly 20. With this, the suspension assembly 20 is made to align with the body 10 so that the center position BC of the body 10 and the center position SC of the suspension assembly 20 match.

Herein, when the body 10 is lowered while the center position BC of the body 10 and the center position SC of the suspension assembly 20 are being made to match, first, the damper caps 246L and 246R are inserted into the damper mounting holes 13L and 13R while being guided to the center of these damper mounting holes 13L and 13R. When the body 10 is further lowered, the bolt portions 244L and 245L and the bolt portions 244R and 245R are inserted into the bolt insertion holes 15L and 16L and the bolt insertion holes 15R and 16R.

As shown in FIG. 10, in the tightening process, the suspension assembly 20 is attached to the body 10 by fixing with bolts at the predetermined tightening locations in the body 10 and the suspension assembly 20 that have been aligned More specifically, the tightening system is controlled to fasten the bolt portions 244L and 245L that have been inserted in the bolt insertion holes 15L and 16L of the damper housing 12L and the bolt portions 244R and 245R that have been inserted in the bolt insertion holes 15R and 16R of the damper housing 12R by nuts, and fixes the damper mounts 243L and 243R of an upper end side of the damper assemblies 24L and 24R with the damper housings 12L and 12R with bolts. In addition, at this time, the lower frames 14L and 14R of a lower end side of the body 10 and the sub-frame 21 are fixed with bolts at sub-frame-side tightening locations 29L and 29R.

Figure 11:
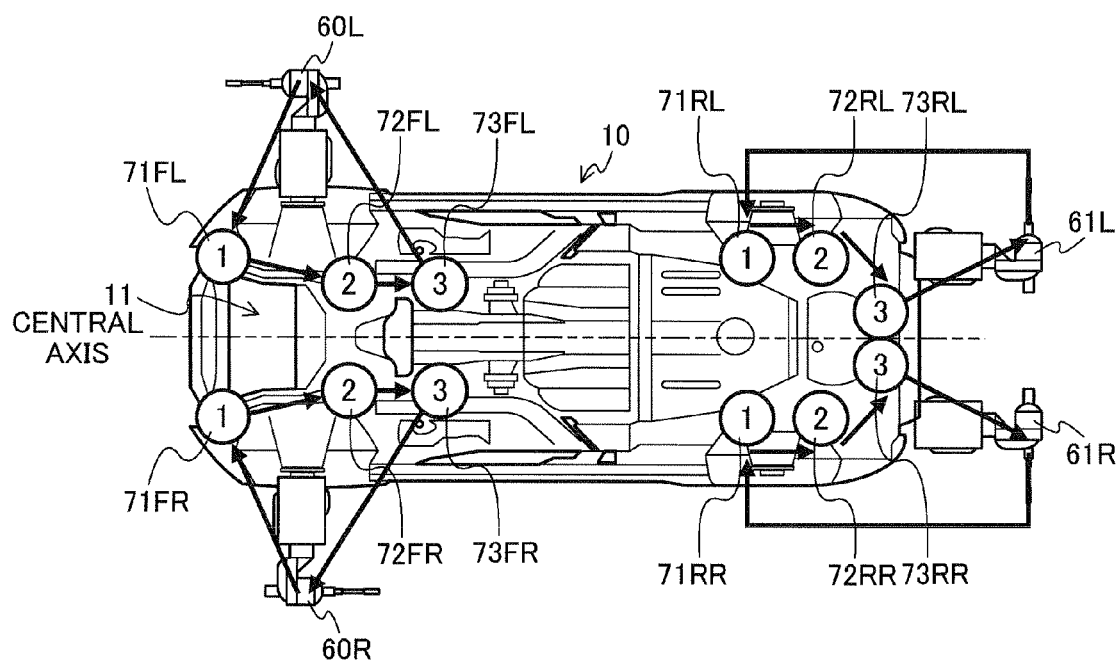
FIG. 11 is a bottom view of a body according to the embodiment.

Referring to FIG. 11, the tightening order of a plurality of bolts when fixing the suspension assembly to the body 10 will be explained.

FIG. 11 is a bottom view of the body 10.

As shown in FIG. 11, the body 10 is a substantially rectangular shape. The body 10 is fixed to the suspension assembly by fixing a plurality of tightening locations with bolts. In order to fix such a plurality of tightening locations with bolts, a plurality of the tightening robots 60L, 60R, 61L, and 61R are disposed in the vicinity of the body 10. These tightening robots 60L, 60R, 61L, and 61R respectively fix each tightening location of the front left, front right, rear left, and rear right of the body 10 with bolts in a predetermined order.

In the present embodiment, in a case of tightening a plurality of bolts, symmetrical tightening locations relative to a central axis extending along the front-back direction of the body 10 are tightened as shown by the plurality of white circles in FIG. 11, and then the remaining unsymmetrical tightening locations (not illustrated) relative to the central axis are tightened.

In FIG. 11, among the plurality of tightening locations, only the tightening locations that are at symmetrical positions relative to the central axis of the body 10 extending along the front-back direction of the automobile are shown. The numerals "1", "2", and "3" inside these white circles each indicate the tightening order. The tightening locations 71FL, 72FL, and 73FL of the front left are symmetrical relative to the central axis with the tightening locations 71FR, 72FR, and 73FR of the front right, respectively.

The tightening locations 71RL, 72RL, and 73RL of the rear left are symmetrical relative to the central axis with the tightening locations 71RR, 72RR, and 73RR of the rear right, respectively.

Therefore, when tightening the symmetrical tightening locations relative to the central axis, for the front, first the pair of tightening locations 71FL and 71FR is tightened, then the pair of tightening locations 72FL and 72FR is tightened, after which the pair of tightening locations 73FL and 73FR is tightened, by the tightening robots 60L and 60R, respectively. With this, tightening for the front can be performed in a left-right symmetrical order about the central axis.

On the other hand, for the rear, first the pair of tightening locations 71RL and 71RR is tightened, then the pair of tightening locations 72RL and 72RR is tightened, after which the pair of tightening locations 73RL and 73RR is tightened, by the tightening robots 61L and 61R, respectively. With this, tightening for the rear can be performed in a left-right symmetrical order about the central axis.

Herein, it is particularly preferable for tightening for the front and rear to be performed substantially simultaneously.

After having fixed the left-right symmetrical tightening locations with bolts in the above way, the remaining unsymmetrical tightening locations relative to the central axis of the body 10 are tightened in a predetermined order. With this, the suspension assembly is fixed to the body 10.

In the above way, the suspension assembly is fixed to the body 10.

According to the present embodiment, there are the following functional effects.

(2) The center position BC of the body 10 and the center position SC of the suspension assembly 20 are calculated, and the suspension assembly 20 is attached to the body 10 so that this center position BC of the body 10 and center position SC of the suspension assembly 20 match. Furthermore, herein, the sub-frame 21 connecting the lower end sides of the pair of damper assemblies 24L and 24R are fixed to the lower frames 14L and 14R of the body 10, while the damper mounts 243L and 243R of the upper end side of the pair of damper assemblies 24L and 24R are fixed to the damper housings 12L and 12R of the body 10. In this way, by fixing the upper end side and lower end side of the pair of damper assemblies 24L and 24R in the same process, the sub-frame 21 does not move as conventionally.

With this, the suspension assembly 20 can be attached to the body 10 with the difference in the left and right camber angles reduced as much as possible.

(3) Among the plurality of tightening locations in the suspension assembly 20, the tightening locations positioned symmetrically relative to the central axis of the body 10 are tightened in pairs. Thereafter, the tightening locations positioned unsymmetrically relative to the central axis are tightened. In this way, it is possible to prevent the suspension assembly 20 from rotating relative to the body 10, and the attitude relating to the body 10 from shifting from a left-right symmetrical position, by tightening the tightening locations positioned symmetrically relative to the central axis of the body 10 in pairs. Therefore, the suspension assembly 20 can be attached to the body 10 with high precision.

(4) Since the plurality of tightening robots 60L, 60R, 61L, and 61R that tighten tightening locations common to a plurality of models and a plurality of unique location tightening units 70L, 70R, 71L, and 71R that tighten tightening locations unique to each of a plurality of models are provided, the versatility and operation rate of the mounting system 1 can be improved. In addition, since it is not necessary to produce a dedicated tool when developing a new model, the cost required for equipment can be reduced.

In addition, when making the nut runner 71 of these unique location tightening units 70L, 70R, 71L, and 71R to oppose a unique tightening location, the gripping portion 724 of the advance/retract mechanism 72 is manipulated by the tightening robots 60L, 60R, 61L, and 61R that tighten common tightening locations, and this advance/retract mechanism 72 is made to move along a horizontal plane. In other words, since it is not necessary to provide a driving source for causing the advance/retract mechanism 72 to move along a horizontal plane in these unique location tightening units 70L, 70R, 71L, and 71R, the cost required for equipment can be reduced.

It should be noted that the present invention is not to be limited to the embodiments, and modifications, improvements, etc. within a scope that can achieve the object of the present invention are included in the present invention.

For example, although the body 10 was lowered when attaching the suspension assembly 20 to the body 10 in the second embodiment, it is not limited thereto. For example, the suspension assembly may be raised when attaching the suspension assembly to the body.

The invention claimed is:

1. A method of measuring a displacement amount of a measurement point of a work surface from a reference position using a photographing device and a laser distance sensor, wherein the measurement point is different from the reference position, a reference plane is set at the reference position and parallel to the work surface, and a distance from the photographing device to the reference plane is set as a reference distance, the method comprising:
    measuring by the photographing device a first displacement amount of the measurement point in a first direction from a first intersection of a photographing direction vector and the reference plane to a second intersection of the reference plane and a vector from the photographing device to the measurement point;
    measuring by the laser distance sensor a second displacement amount of the measurement point in a second direction perpendicular to the reference plane from the reference plane to the work surface; and
    calculating a third displacement amount of the measurement point in a third direction within a plane of the work surface based on the first displacement amount measured by the photographing device, the second displacement amount measured by the laser distance sensor, and the reference distance.

2. The method of claim 1, wherein the third displacement amount is a product of the first displacement amount and the sum of the reference distance and the second displacement amount divided by the reference distance.

* * * * *